H. MOORE.
Corn-Planters.

No. 158,431.  Patented Jan. 5, 1875.

Witnesses:  Inventor:

UNITED STATES PATENT OFFICE.

HIRAM MOORE, OF GREEN LAKE TOWNSHIP, GREEN LAKE COUNTY, WIS.

IMPROVEMENT IN CORN-PLANTERS.

Specification forming part of Letters Patent No. 158,431, dated January 5, 1875; application filed June 11, 1872.

*To all whom it may concern:*

Be it known that I, HIRAM MOORE, of the township and county of Green Lake, in the State of Wisconsin, have invented certain new and useful Improvements in Corn-Planters, of which the following is a full, clear, and exact description, reference being had to the accompanying drawings, which make part of this specification, and in which—

Figure 1:
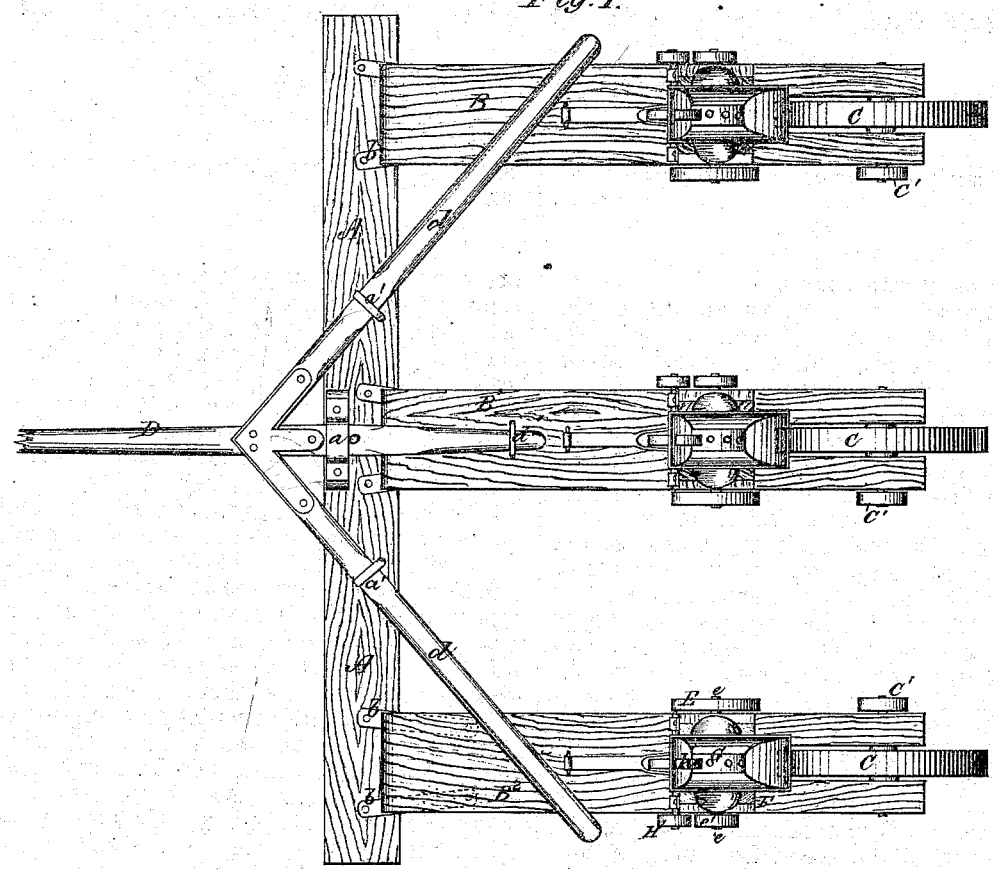
Figure 2:
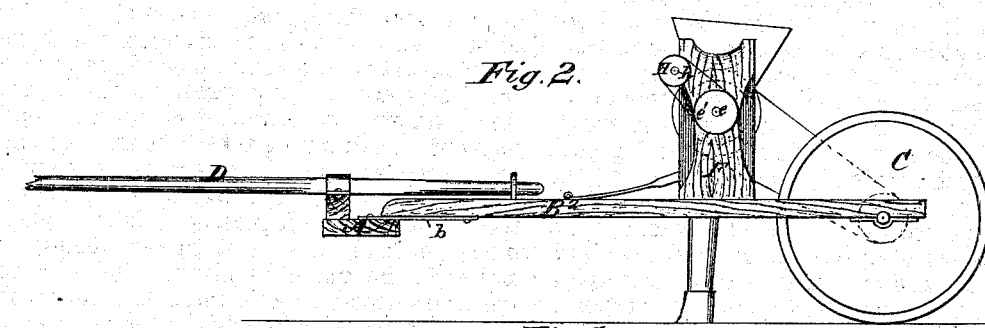
Figure 3:
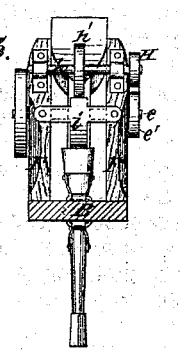
Figures 4, 5:
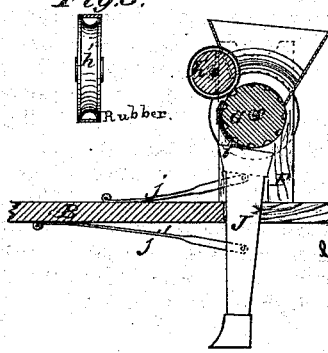

Figure 1 represents a plan or top view of a corn-planter in which all my improvements are embodied. Fig. 2 represents a side elevation thereof. Fig. 3 represents a front elevation of one of the feeding devices. Fig. 4 represents a longitudinal central vertical section through one of the feed-wheels at the line $x\ x$ of Fig. 3, and Fig. 5 an edge view of one of the feed-wheels.

The improvements herein claimed relate to the method of combining the tongue, draft-frame, and planting-frames; to the construction of the seeding mechanism; and to the combination of the seed-tubes and planting mechanism, which improvements are fully specified in the claim of this specification.

In the accompanying drawings, a main frame, A, is shown as composed of a single bar arranged transversely to the line of draft. The frames B B¹ B², which carry the planting mechanism, are pivoted, at their front ends, to this bar by links $b$, composed of elastic strips of metal, which allow a slight degree of motion both vertically and laterally to the connection. The rear end of each frame B B¹ B² is supported by a wheel, C. A tongue, D, provided with diagonal braces $d$, inclining both backwardly and outwardly, passes through a loop, $a$, on the main frame, and a corresponding eye, $d'$, on the central frame, B¹. The height of this eye is greater than that of the tongue, to allow the latter a slight degree of vertical play. A pin inserted in the tongue behind the loop $a$ holds it in position, or it may be so held by any proper well-known mechanism. The diagonal braces $d$ pass under hooks $a'$ on the main frame, and rest upon the outer dropper-frames, B B². The tongue thus prevents the joints between the main and dropper frames from flexing vertically beyond a given point, while allowing any one of the dropper-frames to drop slightly or to move laterally independently of the others. A cord encircling a pulley, $c'$, on the wheel C, encircles a wheel, E, on a shaft, $e$, mounted in suitable bearings in the hopper-frame F, which latter rests on the dropper-frame. The bottom of the hopper is open, and a wheel, G, mounted on the shaft $e$, revolves in this opening. This wheel is provided with notches or recesses on its periphery, each of a depth just sufficient to contain a grain of corn. A band encircling a pulley, $e'$, on the end of the shaft $e$, opposite the wheel E, drives a pulley, H, on a shaft, $h$, turning in suitable bearings on the hopper, and carrying a wheel, $h'$, which projects through a slot in the side of the hopper and bears upon the feed-wheel G. As the wheel $h'$ rotates in the same direction as the wheel G, (their faces in contact moving in opposite directions, the one up and the other down,) it serves to brush therefrom any grain projecting above the cells or recesses, and thus secures regular feeding. This wheel has a concave periphery, and is covered by an elastic band of rubber or gutta-percha, (see Fig. 5,) thus securing an elastic surface, which will yield to accommodate large grains without crushing them, and prevent the choking of the feed. A strip, $i$, arranged below the clearing-wheel $h'$, extends around the front of the feed-wheel G, and prevents the grains from dropping out of the cells until the proper moment. A dropping-tube, J, is arranged beneath the feed-wheel G, to receive the grain as it falls therefrom. Instead of being rigidly secured to the seeding-frame, this tube plays freely vertically in a slot therein, being attached to the frame by pivoted links $j\ j'$, respectively located above and below the frame, thus acting as stops to limit the movements of the tube. The lower link, $j'$, is connected with the tube by a wooden pin, in the usual way, to allow the tube to give way in case of encountering an obstacle, and thus prevent injury.

The operation of the machine is such that, as it is drawn forward, the seeding-frames have both vertical and lateral play allowed them, the grains are regularly deposited, each in its respective cell, and fed regularly and dropped uniformly through the tube into the furrow opened for it.

I claim as my invention—

The loose tongue with its diagonal braces, the draft-frame, the planting-frames, their supporting-wheels, and the pivoted links connecting the draft-frame and planting-frame, these members being constructed, combined, and operating substantially as hereinbefore set forth.

In testimony whereof I have hereunto subscribed my name.

HIRAM MOORE.

Witnesses:
  JOE I. PEYTON,
  E. C. DAVIDSON.